Oct. 28, 1969  E. WESENER  3,474,877

TRACKLESS CONVEYOR INSTALLATION

Filed April 26, 1967  5 Sheets-Sheet 1

INVENTOR.
ERich WESENER
BY Jacobi & Davidson
Attorneys

Oct. 28, 1969  E. WESENER  3,474,877
TRACKLESS CONVEYOR INSTALLATION
Filed April 26, 1967  5 Sheets-Sheet 2

INVENTOR.
E-Rich Wesener
BY
Jacobi & Davidson
(Attorneys)

Oct. 28, 1969  E. WESENER  3,474,877

TRACKLESS CONVEYOR INSTALLATION

Filed April 26, 1967 5 Sheets-Sheet 3

INVENTOR.
ERICH WESENER
BY
Jacobi & Davidson
Attorneys

Oct. 28, 1969  E. WESENER  3,474,877
TRACKLESS CONVEYOR INSTALLATION
Filed April 26, 1967  5 Sheets-Sheet 4

INVENTOR.
ERich WESENER
BY

United States Patent Office 3,474,877
Patented Oct. 28, 1969

3,474,877
TRACKLESS CONVEYOR INSTALLATION
Erich Wesener, Munich, Germany, assignor to Buro Patent AG, Glarus, Switzerland, a Swiss corporation
Filed Apr. 26, 1967, Ser. No. 633,871
Int. Cl. B60s 9/22; B61k 1/00
U.S. Cl. 180—98                                                    23 Claims

ABSTRACT OF THE DISCLOSURE

A trackless conveyor installation of the type where at least one conveyor car is movable along a predetermined path of travel and equipped with control means for setting a desired destination to which the conveyor car should travel. Guide track means are located along the path of travel and such include means providing stop station means and means providing switch means. Further, code marking means are disposed at the region of the switch means, each of said code marking means corresponding to a given switch number. Additionally, the conveyor car is equipped with means for reading the code marking means and means for controlling the direction of travel of the conveyor car at each switch means in response to the code marking means read at the relevant switch means and in response to the destination set at the control means.

Background of the invention

The present invention relates to an improved trackless conveyor installation equipped with at least one conveyor car provided with a control device. This conveyor car can move, without a driver and self-controlled to a predetermined destination set at the control device, along a guide track having stop stations and switches and placed along the path of travel or way for the conveyor car.

Such type of conveyor installation has universal applicability and is particularly suitable, for example, equally well for factories, administrative offices, governmental agencies, hospitals and so forth. In this respect, both a horizontal as well as a vertical movement or transport is possible.

A large number of more or less extensively automatic small and large conveyor installations are already known to the art. However, all of them have the decisive drawback that they must work with track installations, small roller-tracks, tube guides and the like. The installation of such equipment in buildings oftentimes is associated with considerable difficultes and extensive costs, particularly if the installation is to be carried out in buildings which have already been built.

Furthermore, a trackless conveyor installation is known to the art where an electric prime mover equipped with a control device can move, without a driver and self-controlled to a predetermined destination adjusted at the control device, along white guide strips having stop means and switches and provided at the path of travel for the conveyor car. However, the control device always incorporates toggle switches or switching keys for each switch and for each stop station, whereby depending upon the position of a switching key the electric prime mover travels to the left or right of the associated switch and stops or moves past a stop station. The further switching of the control device from switch to switch and from station to station, in each case, takes place by means of an indexing mechanism mounted at the control unit which is indexed one step in every case by means of permanent magnets at the path of travel in the region region of the switches and the stop stations. However, this known prior art conveyor installation possesses considerable drawbacks. First of all, the setting of the desired destination station is cumbersome since from each position of the electric prime mover the operator must once again count the number of switches with their momentary throughtravel directions and the number of stations which have to be passed and this information must be individually set at the control devce. With complicated paths of travel it is practically impossible to carry such out with out the benefit of a track plan. A further, more decisive disadvantage of this type of installation is the fact that the electric prime mover can only travel in one plane. Therefore, it is not possible to employ such with a conveyor installation arranged in a number of stories.

Summary of the invention

Accordingly, it is a primary object of the present invention to provide an improved trackless conveyor installation of the aforementioned type which effectively overcomes the drawbacks of the prior art structures.

Another, more specific object of this invention is directed to the provision of an improved trackless conveyor installation which is exceptionally flexible and can be utilized in many different environments, can be subsequently installed without any great difficulty in existing structures and can be used in a number of stories, and apart from this, is still nonetheless extremely simple to operate.

As already explained, the inventive trackless conveyor installation is of the type incorporating at least one conveyor car provided with a control device. Such conveyor car can move, without a driver and self-controlled to a predetermined destination which has been set at the control device, along a guide track having stop stations and switches and provided at the path of travel for the conveyor car. More precisely, the inventive conveyor installation is generally characterized by the features that code markings are arranged in the region of the switches which correspond to the switch number. Further, the conveyor car is provided with means for reading the code markings as well as means which, on the basis of the read-out code marking and the destination set at the control device, controls the conveyor car in that direction which it is to take at the relevant switch.

The guide track and the scanning or reading device can operate according to different principles, for instance according to the principles of high frequency, optics or induction. During operation according to the principle of high frequency it is possible to place a high frequency cable at or in the path of travel. When operating according to the optical principle the guide track can consist of a colored tape or band which is preferably white. In order to prevent wear and soiling the colored band can also be formed from an aluminum strip which, in order to increase the contrast, can be provided at both sides with a dark, preferably black marginal strip.

Inductive scanning has proven itself to be particularly advantageous since such operates with the greatest reliability and is least susceptible to disturbances. With such type scanning or reading it is possible to employ a simple band or tape formed of ferromagnetic material as the guide track, preferably an iron band which has been placed on or in the floor.

Depending upon the construction of the conveyor car it has proven to be advantageous to arrange the guide track either coaxially with regard to the path of travel for the conveyor car or eccentrically with respect thereto. The latter arrangement is recommended, for instance, if the conveyor car is constructed as a three-wheeled vehicle and one wheel is arranged at the center of the axle.

A decisive advantage of the conveyor installation of the present invention resides in the simple and operationally reliable control principle. In this regard, each switch has a number which can be represented by a code marking and which is read by means provided at the conveyor car. Furthermore, the reading or scanning means of the conveyor car can only read the code markings to which the reading means have been adjusted to be responsive. If the code markings which have been set at the reading means correspond with those at the switch then the conveyor car can branch off at the switch. When there is a non-coincidence between the code markings which have been set at the reading means and those at the switch then the conveyor car cannot turn off, rather travels in a straight line or straight ahead. By regulating the reading means of the conveyor car to a certain combination of code markings it is possible for the conveyor car to seek its own destination. Advantageously, the combination of code markings which have to be read for each destination need not always be readjusted or set at the reading means for a destination, rather the combinations required for the different destinations are determined once and for all and stored in the control device of the conveyor car. Consequently, the individual stored combinations can be retrieved, for instance, by actuation of a suitable so-called destination key or button. What is important with the present control principle is that the combination of code markings for a destination always remains unchanged, irrespective from which point of the conveyor installation the conveyor car is displaced to its destination. This type of possibility is not provided with the known automatic conveyor installations since, with these prior art structures, it is necessary to set different switch-stop station-combinations from different locations of the installation.

The subject conveyor installation can be advantageously constructed in such a manner that it is possible to provide additional code markings along the path of travel and to equip the conveyor cars with means for reading these additional code markings. Owing to these measures further control possibilities are achieved. In particular, due to such an additional code marking it is possible to control an automatic starting in the forward or rearward direction, or it is possible to trigger additional operations of the conveyor car, such as for instance automatic discharge or emptying.

A further very advantageous construction of the conveyor installation is provided if the conveyor cars are equipped with code markings which can preferably be set or adjusted in different combinations and which can be read or scanned by means arranged along the path of travel. As a result, it is possible to control devices which are provided advantageously along the path of travel. Owing to these additional code markings the most important requirements for operating an elevator for instance are complied with. By means of these code markings at the conveyor cars and appropriate reading or scanning means, which are preferably arranged in front of and/or in the elevator, it is possible to call the elevator and to send it to a story defined by the code markings.

Since reading or scanning of the aforedescribed three types of code markings advantageously occurs during travel, it is desirable that the code markings and the reading means of each respective marking location possess a so-called marker, and further, that the reading means are connected in such a manner that the code markings can only be read at the moment of coincidence of both markings. By means of this marker it is possible to carry out a so-called flying scanning, that is to say, a scanning during travel.

The inventive conveyor installation is exceptionally suitable for diversified uses and, in particular, can be subsequently installed in existing buildings or structures without any great structural modifications or manipulations. Since the conveyor cars can use the standard sidewalks and paths of travel and the standard passenger or freight elevators of a building the tracks or guide devices which are required with the known conveyor installations become superfluous in this case. Breakdown of the installation is considerably avoided, particularly when using guide tracks formed of ferromagnetic material, since the guide tracks do not contain any movable elements and the code markings along the path of travel, as a general rule, consist of fixedly installed, maintenance-free permanent magnets.

The present conveyor installation of the invention offers the best conditions for a more or less extensive automatic operation. More precisely, the control device can be constructed in such a manner that it contains switchable means through actuation of which the conveyor car, upon reaching a destination station and as the case may be after completing a desired function or operation, can automatically be returned to its base or home station. This possibility is for instance necessary if the conveyor cars should travel to an automatic refuse disposal station, there dumps or unloads the refuse, and subsequently again returns back to the home station or place of origin.

As a further stage in the automatization of the conveyor installation the control device can be extended or amplified in such a manner that it is possible to set or regulate two or more destinations which are to be successively controlled, whereby the conveyor car, if desired, can carry out at the one or the other station one or more functions.

Finally, the conveyor installation can be particularly constructed for mail order houses or warehouses in such a manner that the control device of the conveyor car can be programmed by fed-in programs, so that the conveyor car for instance can depart from successive different stations of a storage area and there automatically retrieve goods for instance. For this purpose the conveyor car can be equipped with additional code markings which are controlled by the program. These code markings can be read by reading means mounted for instance at the floor or at a storage frame and cooperating with such storage frame, whereby then the storage location delivers the goods or materials designated by the code markings.

The conveyor cars are advantageously driven electrically by means of batteries. In this regard it is advantageous if the conveyor cars possess an automatic charging control. This charging control is operably coupled with the control device in such a manner that upon dropping below a minimum charged condition the conveyor car, preferably after it has carried out its assignment, automatically travels to a likewise automatic charging station where, after it has recharged its batteries, again automatically travels back to its home station. The automatic charging station is preferably constructed as a throughpassage station. It is also possible that the conveyor cars after recharging their batteries do not return to the home station, rather are placed at a collecting station connected to the charging station. From this location the conveyor cars can be retrieved, for instance by being remote controlled.

Brief description of the drawings

The invention will be better understood, and objects other than those set forth above, will become apparent, when consideration is given to the following detailed description thereof. Such description makes reference to the annexed drawings wherein.

Description of the preferred embodiments

Figure 1:
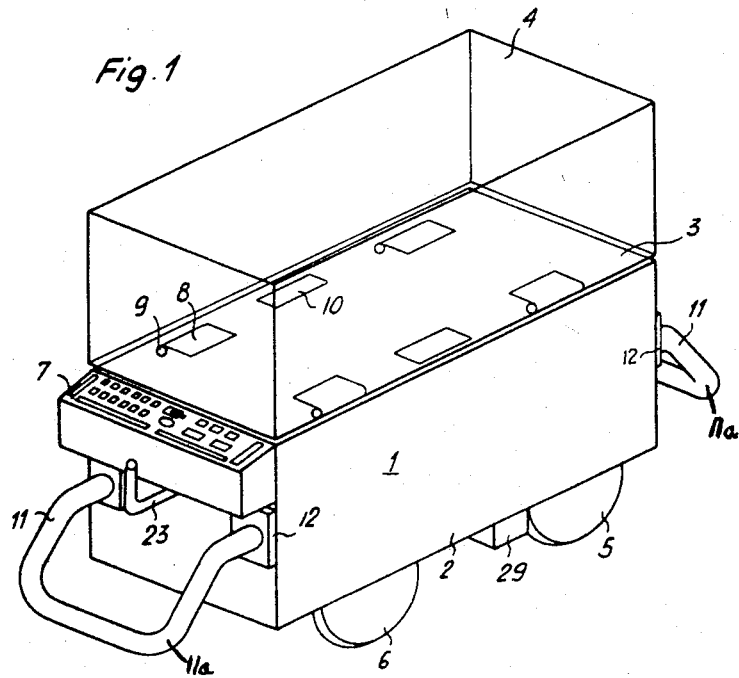
FIGURE 1 is a perspective view of a conveyor car carrying a container thereon.

With reference now to the drawings, in FIGURE 1 there is depicted a conveyor car 1 having a carriage or underframe 2 and a storage or loading surface 3. Supported upon this loading surface 3 is a schematically depicted container or box 4. As more fully depicted in FIGURE 2 the carriage or underframe 2 possesses a pair of driven wheels 5 and a pair of articulated wheels 6. All of the drive-, scanning or reading-, code- and control devices are housed in the underframe 2. Furthermore, this underframe or carriage 2 is equipped with a control desk or console 7 at which all of the operations which should be carried out by the conveyor car 1 can be adjusted.

As will be further recognized by inspecting FIGURE 1, the container 4 is retained upon the underframe 2 by means of suitable electrically lockable magnetic holder or locking means 8. In order to remove the container 4 it is only necessary to release the locking action of the magnetic holder means 8. The latter can preferably be provided with hinge means 9 so that this container 4, by releasing the magnetic holder means 8 at one side of the conveyor car 1, can be tipped to the other side about the hinge means 9 of the magnetic holder means 8 at one side of the conveyor car 1, can be tipped to the other side about the hinge means 9 of the magnetic holder means 8. Reference numeral 10 represents a lifting mechanism by means of which the tilting of the container 4 can be optionally mechanically carried out towards one or the other side of the conveyor car 1. The tilting mechanism 10 can be coupled with a control device 20—the details of which will be explained more fully hereinafter—in such a manner that upon reaching a destination station or through the action of a certain coding placed along the path of travel, this tilting mechanism 10 can be activated.

Furthermore, the underframe 2 of the conveyor car 1 is equipped with a quick-stop device which immediately arrests movement of this conveyor car 1 if it should run into an obstacle. Such quick-stop device can consist of overload switch means, slipping clutch means or contact switches, whereby the latter can operate pneumatically or hydraulically. In the exemplary embodiment there are provided pneumatic contact switches 11 which are composed of a respective projecting hose loop arrangement 11a (FIGURE 1). These hoses 11a are filled with a liquid or fluid which coacts with the diaphragm of a switch 12. As shown, one such hose loop arrangement 11a is arranged over the full width of the front and the rear, respectively, of the conveyor car 1 of FIGURE 1. Furthermore, the contact switch means 11 can be arranged in such a manner that they are simultaneously operable at both sides of the conveyor car 1. On the other hand, it is particularly advantageous if the respective contact switch 11 disposed at the side of the direction of travel is switched in. As a result, it is possible to permit the conveyor cars 1 to travel at a close spacing with respect to one another at the conveyor installation, so that for instance if two conveyor cars which are moving in the same direction bump into one another the forwardmost conveyor car is in no way influenced in its operation and merely travels further along whereas the rear conveyor car, on the other hand, for the moment of contact with the forward conveyor car stops.

Figure 2:
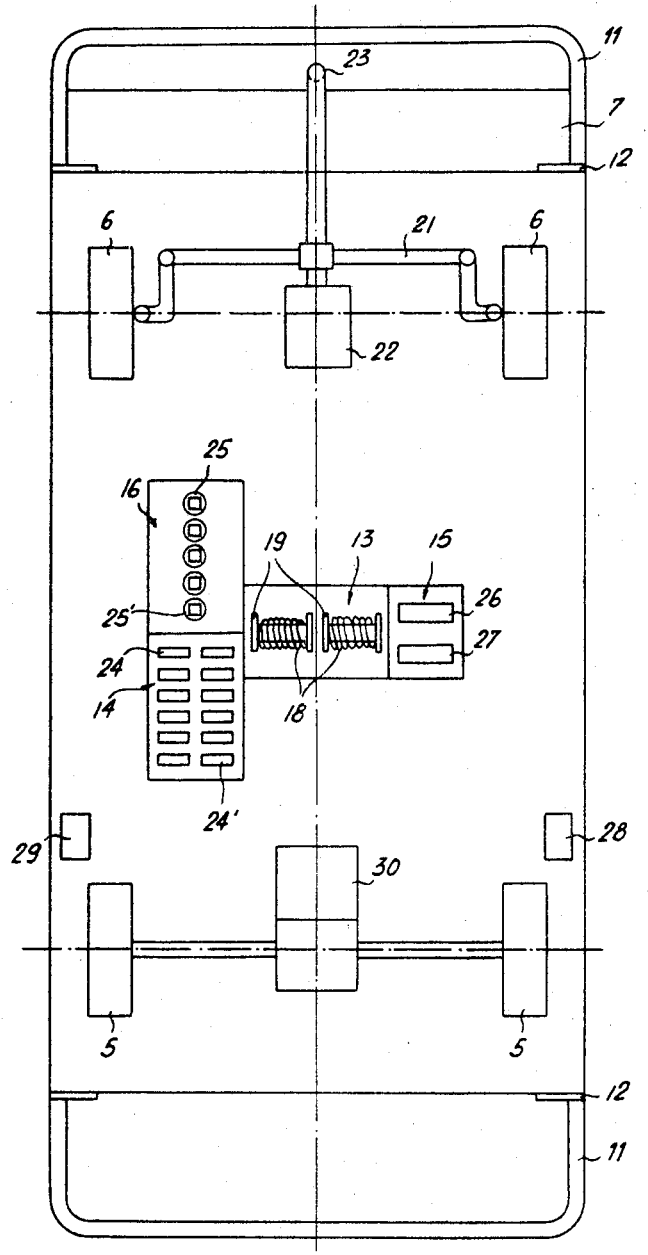
FIGURE 2 is an enlarged bottom plan view of the conveyor car depicted in FIGURE 1.

In FIGURE 2 there is depicted a bottom plan view of the conveyor car 1 of FIGURE 1. By referring to this figure there will be recognized the track reading or scanning mechanism 13, the reading means 14 for the code markings placed along the path of travel, additional reading means 15 for further code markings, and a coding mechanism 16.

Figure 6:
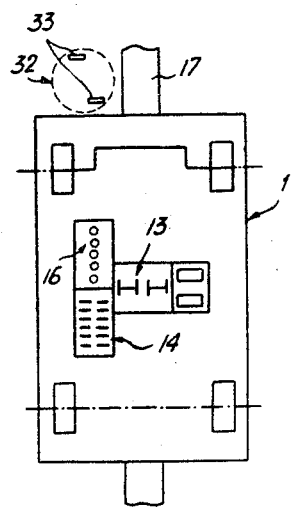
FIGURE 6 depicts details of a reading or scanning device for the guide track which is operably coupled with the control device of the conveyor car and the steering mechanism therefor.
Figure 6:
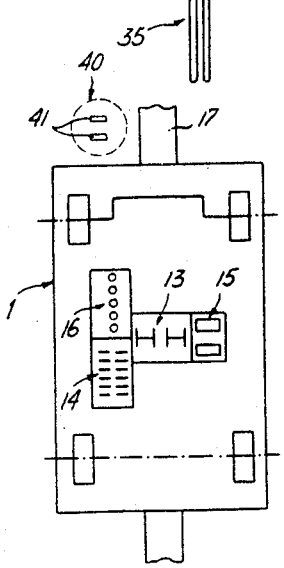
Figure 6:
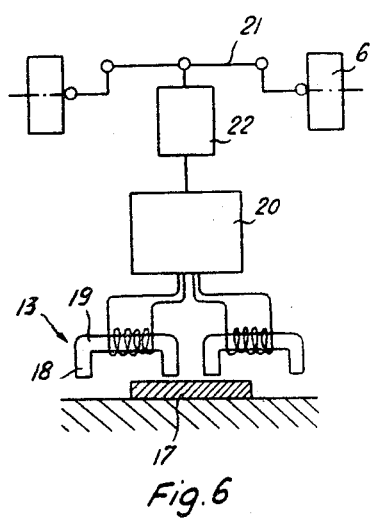

As additionally perceivable by referring to FIGURE 6, the aforementioned track scanning mechanism or device 13 features two adjacent arranged electromagnets 18 which are arranged substantially perpendicular to the guide track means 17. These electromagnets 18 each possess a substantially U-shaped iron core 19, the open end of which is directed towards the guide track means 17. These electromagnets 18 are coupled with the control device 20 which, in turn, is connected in series with the regulating or positioning motor 22 cooperating with the steering device 21. The mode of operation of the scanning mechanism 13 is such that upon change of the mutual arrangement of the iron band or strip of the guide track 17 and the electromagnets 18 there is produced a control value or magnitude which, after evaluation by the control device 20, arrives as a steering impulse at the servo-motor or regulating motor 22.

Furthermore, the scanning device 13 and the control device 20 are constructed in such a manner that in the absence of the guide track 17 the drive is switched out. A lever 23 is connected with the steering mechanism or device 21 and by means of which the conveyor car 1 can also be manually controlled after switching out the automatic control.

The reading or scanning means 14 for reading the code markings arranged along the path of travel advantageously comprises a double row arrangement of magnetic switches 24 which are situated laterally adjacent the scanning means 13. Of these magnetic switches 24 one such magnetic switch, designated by reference numeral 24′, is constructed as a marker. As will be more fully developed shortly, the code markings possess an appropriate marker. For the position of the marker there is always selected an extreme or exposed position which, for instance, could also be externally of the row arrangement. The number of magnetic switches 24 depends upon the number of stations and/or switches or upon the number of further operations which are to be carried out by the conveyor cars 1. A code marking consists of at least the marker and at least one further marking location which is spatially arranged with respect to such marker. If the number of stations and switches is large it is possible to add still further marking locations to a code marking. In order to read a certain code marking only the appropriate magnetic switches 24 are preferably connected behind one another or in series, whereas all remaining switches are switched out. In order to control a certain station one code marking will not suffice, rather as a general rule a number of code markings must be simultaneously adjusted in accordance with the switches and stations which are to be passed over.

The reading means 14 are likewise coupled with the control device 20 in such a manner that a certain code marking always triggers an associated function at the conveyor car 1. Thus, for instance, the code marking of a switch triggers actuation of the steering device 21 in the direction of the switch siding or branch line. The reading means 14 need not only be employed for reading the switch code markings, rather can be used to also read further code markings employed for triggering additional functions, such as for instance tilting of the tilting mechanism 10.

Continuing, it will be recognized that a coding mechanism or device 16 is likewise arranged laterally adjacent the scanning means 13 and, viewed in the forward direction of travel of the conveyor car 1, in front of the reading means 14. This coding device 16 consists of a number of electromagnets 25 which can be optionally adjusted in accordance with a desired code. Also this coding mechanism 16 has a marker 25'. Furthermore, coding mechanism 16 is likewise operably coupled with the control device 20 and serves for transmitting a code which can be read by means arranged along the path of travel and can at such location place certain devices into operation.

Adjacent the scanning device 13, however at the opposite side of the reading means 14, there are arranged further reading means 15. These further or additional reading means 15 consist of two magnetic switches 26 and 27 which, in each case, respond to a different polarity of an electromagnet. They serve to trigger the optional forward or reverse travel.

Further, in FIGURE 2 there will be additionally recognized two current removal devices 28 and 29, by means of which it is possible to operatively connect the conveyor cars 1 to the current rails of a suitable charging station in that, the conveyor car 1 simply moves between the current rails of such charging station until the current removal devices 28 and 29 contact such current rails. Further, in FIGURE 2 there will be recognized the drive motor 30 which serves to drive the wheels 5.

Figure 3:
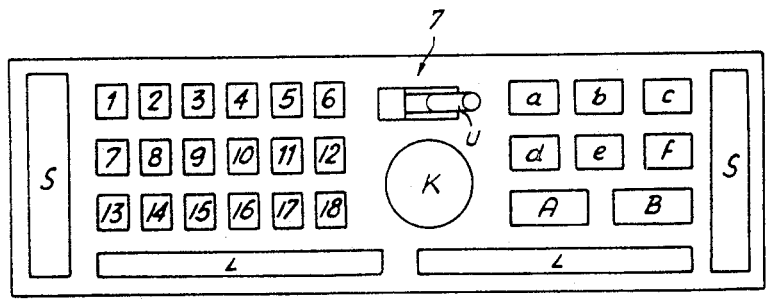
FIGURE 3 is an enlarged schematic view showing details of the control desk or control console of the conveyor car.

FIGURE 3 depicts details of the control desk or console 7 at which the different control functions can be set. In this regard, the keys represented by reference numerals 1 to 18 serve for setting the stations, the keys or buttons L for eradicating the setting, the keys S for starting or stopping the conveyor car, the key A for the forward or reverse travel, the key B for the return of the conveyor car after reaching its destination station and completing its operation or function, the keys a and b for dumping or tilting to the left or right at the destination station, and the keys c to f are empty keys which can be used for adding additional operations. Furthermore, reference numeral U represents a toggle or tiltable switch for changing over from an automatic operation into a manual operation and reference numeral K represents a charging control lamp. Of the station keys 1 to 18 one of them can designate or represent the charging station.

Figure 4:
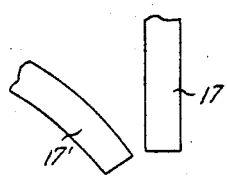
FIGURE 4 schematically depicts details of a switch arrangement for the conveyor cars.

FIGURE 4 shows a switch 31 at which a conveyor car 1 is just arriving. These switches 31 are formed, on the one hand, in that they do not possess any guide track 17 and, on the other hand, exhibit a code marking means 32 in front of or upon the switch 31. In the simplest manifestation such code marking means 32 consists of two permanent magnets 33 embedded in the floor. If the code marking which is to be read and which has been set at the reading means 14 corresponds with the switch code marking means 32, then the steering device 21 of the conveyor car 1 receives a steering impulse, whereby it deviates or turns in the direction of the switch branch line or siding 17'. At the actual switch 31 the conveyor car 1 passes without being guided through the guide track 17. The region of the switch 31 which is free of any guide track 17 must only be so large that the kinetic energy of the conveyor car 1 is sufficient for the scanning or reading device 13 to again reach the guide track. If the code adjustment at the reading means 14 and at the switch 31 do not correspond, then the conveyor car 1 moves straight ahead at the switch 31.

Figure 5:
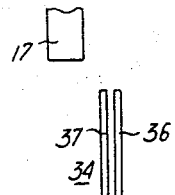
FIGURE 5 schematically depicts details of a stop station for the conveyor cars and equipped with an automatic starting device.

FIGURE 5 depicts a stop station 34 having a starting device 35. This stop station 34 is merely formed by interrupting the guide track 17. If the scanning device 13 and the control means 20 are constructed in such a manner that they switch out the drive during the absence of the guide track 17, then the conveyor car 1 will run out at the holding or stop station 34. The interruption of the guide track 17 must be so large that the coasting conveyor car 1 can no longer reach the continuation of the guide track 17.

Figure 7:
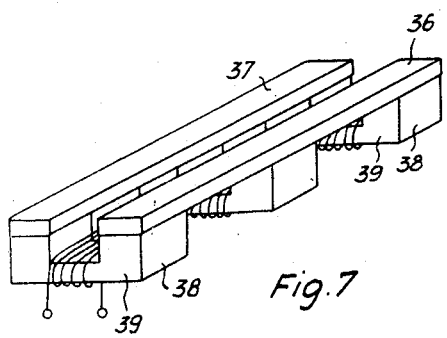
FIGURE 7 is an enlarged perspective view of the starting device of the stop station depicted in FIGURE 5.

If the conveyor car 1 should automatically start at the stop station 34, then it is possible to provide an automatic starting device 35. The latter may advantageously comprise two magnetic bands or strips 36 and 37 which are arranged substantially parallel to the guide track 17, as shown. As best seen by referring to FIGURE 7, these magnetic bands 36 and 37 are preferably formed as bands of ferromagnetic material which are connected with the substantially U-shaped iron cores 38 of the electromagnets 39 arranged beneath such magnetic bands 36, 37 and perpendicular to their lengthwise direction. By changing the direction of current flow in the electromagnets 39 it is possible to change the polarity of the magnetic bands 36, 37. Furthermore, these magnetic bands 36, 37 are scanned by the reading means 15, coupled with the control means and the drive device, in such a manner that depending upon the prevailing polarity of the magnetic bands 36 and 37 the conveyor car 1 travels in the one or other direction. In the absence of a magnetization of the bands 36, 37 the conveyor car 1 remains at standstill.

The stop station 34 can, for instance, be controlled by the conveyor cars 1 in such a manner that along the path of travel in the region of the stop station 34 there is provided a reading device 40, preferably in the form of magnetic switches 41. Such reading device 40 may be arranged at or in the floor and can be read a code set at the code device 16 of the conveyor car 1. The stop station 34 can be constructed in such a manner that the starting direction continuously is set at "starting in forward direction" and only coincidence of the set code markings and the code of the reading device 40 is the starting device 35 cut out. Consequently, it is possible to from a station.

Figures 8, 9:
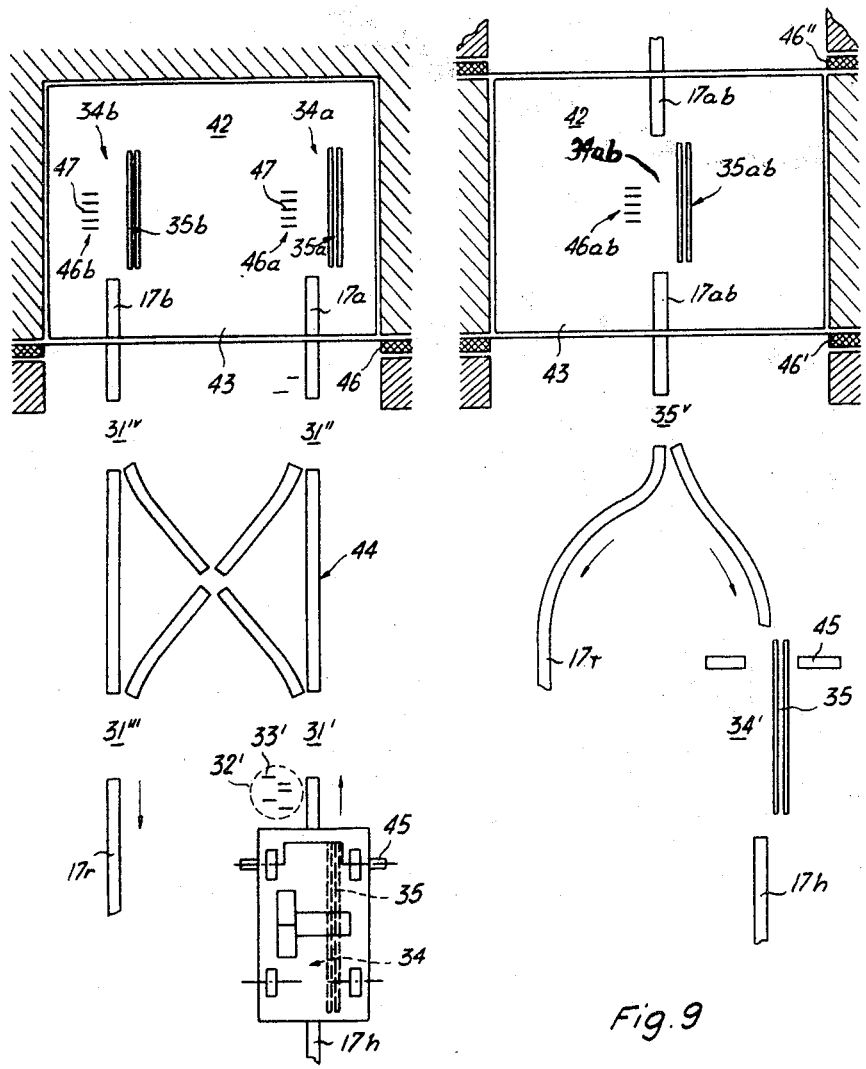
FIGURE 8 schematically illustrates the arrangement of the guide tracks in front of and in an elevator.
FIGURE 9 shows a further arrangement of the guide tracks in front of and in an elevator.

Now, in FIGURES 8 and 9 there are shown arrangements of guide tracks 17 in front of a lift or elevator 42 as well as the mechanisms required for the automatic use of the elevator.

With the present conveyor installation the guide tracks, as a general rule, are only used for travel in one direction. Only in extremely simple installations which do not have a high volume of traffic can a guide track also be employed in the opposite direction. However, it should be assumed that the paths of travel are only used in one direction of mobility. In so doing, it is possible to arrange for instance in a building hall a forward and a rearward track means adjacent one another or, however, the rearward track is situated in a hall or corridor which is separated from the forward track.

Turning attention more particularly to FIGURE 8, it will be recognized that there is depicted therein a forward track 17h and a rearward track 17r, both of which are arranged in front of the elevator 42. Further, a respective guide track 17a and 17b are arranged in the elevator cabin 43 which serves for the ascending and descending directions respectively. Both of the tracks 17h, 17r are connected in front of the elevator 42 by means of a double-cross switch 44.

A stop station 34 equipped with a starting device 35 is arranged in front of the double-cross switch 44 at the incoming or forward guide track 17h. This stop station 34 can be additionally equipped with means 45, for instance in the form of contact ties, for calling the elevator 42. The starting device or mechanism 35 is operably coupled with the control device of the elevator 42 in such a manner that the starting device 35 will be activated when the elevator is unoccupied and the doors 46 thereof are open. Now, the conveyor car 1 starts and must decide at the switch 31' whether it should travel straight ahead or turn off towards the left. This switch 31' contains a code means 32' which receives a code marking which is that of the lower stories or possibly the same story. In this regard, the code means 32' as a general rule, is equipped with a number of permanent magnets 33'. Upon coincidence of the switch coding with that set at the conveyor car 1 the latter travels to the left or in the absence of any coincidence straight ahead into the open, ready elevator cabin 43.

In order to stop the conveyor car 1 in the elevator 42 the guide tracks 17a and 17b are equipped with stopping locations 34a and 34b, each of which is provided with a respective starting device 35a and 35b coupled with the control device of the elevator 42. At each stop location 34a and 34b there is arranged at the floor of the elevator cabin 43 reading means 46a and 46b respectively. Such reading means 46a and 46b preferably consist of magnetic switches 47 and respond to a code set at the code or coding device 16 of the conveyor car 1. The reading means 46a and 46b are coupled with the control device of the elevator 42 in such a manner that, by virtue of a suitable code set at the conveyor car 1, the elevator 42 travels to the desired story. After arriving at its destination story and after opening the elevator doors 46 the starting device 35a or 35b is activated and the conveyor car 1 can leave the elevator 42 and, in so doing, such conveyor car 1 automatically moves into the correct track 17r. When departing from the ascending track 17a the conveyor car 1 must change via the switches 31″ and 31‴ of the double-cross switch 44 into the guide track 17r. When moving out of the descending track 17b the conveyor car 1 can move straight through the switch 31$^{IV}$. Since the switch 31$^{IV}$, during travel out of the elevator 42, must always be passed in a straight or linear direction, no code markings are here necessary. Likewise, the switch 31‴ also does not require a code marking.

FIGURE 9 likewise depicts an elevator 42, the elevator cabin 43 of which, however, is only equipped with one guide track 17ab. The latter further possesses a stopping device 34ab, a starting device 35ab and a reading device 46ab. This guide track 17ab serves both for the ascending as well as descending travel. In front of the elevator 42 the incoming as well as the reverse tracks 17h and 17r respectively, are combined by a simple switch 35$^V$, whereby the passage of the track 17r can form the linear portion of the switch, so that also this switch 35$^V$ does not require any code marking. In the forward or incoming track 17h, similar to the embodiment of FIGURE 8 there is also provided a stop station 34′ equipped with a starting device 35 and means 45 for recalling the elevator cabin 43.

Whereas the operation of the devices depicted in the embodiment of FIGURE 9 corresponds to that of the embodiment of FIGURE 8, the arrangement of FIGURE 9 has as a special feature one outgoing and incoming travel possibility for the conveyor car to both sides of the elevator 42. Accordingly, it will be recognized that this elevator 42 is provided at two opposite sides with doors 46′ and 46″ respectively. Likewise, at both sides of the elevator cabin 43 there are arranged the guide tracks 17ab and in front of the elevator 42 in each instance the same arrangement of the guide tracks 17r, 17h with the associated stop locations 34 with starting device 35 and recall means 45. The direction of departure of the conveyor car 1 out of the elevator cabin 43 is determined by preselection of the polarity of the starting device 35ab in the switch direction of the elevator 42.

Figure 10:
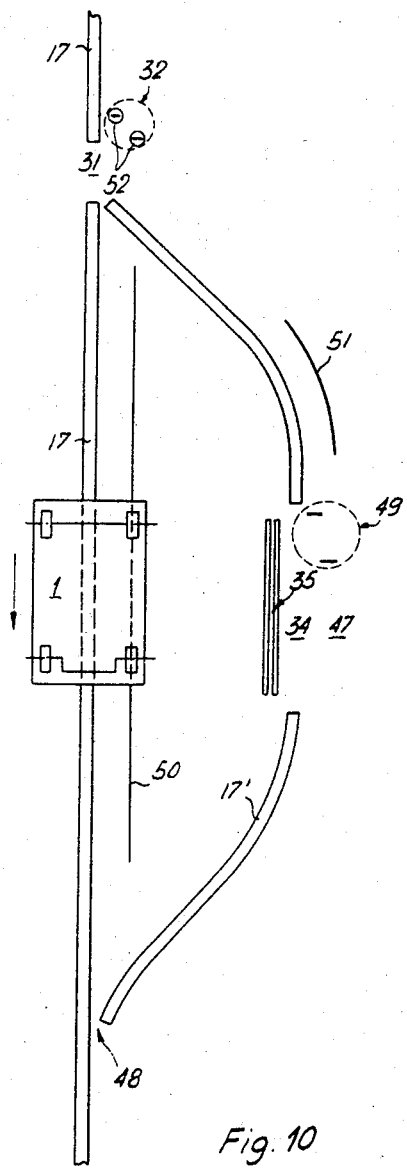
FIGURE 10 schematically represents a station equipped with a right-of-way mechanism.

In FIGURE 10 there is depicted a station 47 which is constructed as a shunting or by-pass location and which in the present instance is designed as an automatic station. This shunting station 47 possesses a switch 31 for transferring a conveyor car 1 out of a main line track 17, and further, exhibits a stop station 34 with a starting device 35 and a feed-in location 48 for again transferring the conveyor car 1 into the main line track 17.

Upon coincidence of the code markings 32 at the switch 31 with the code set at the reading means 14 of the conveyor car 1 the latter branches off and travels up to the hold or stop station 34. At this location, it is possible to provide at the path of travel a further code marking 49 which can be read by the reading means 14 and triggers at the conveyor car 1 an additional operation, for instance tilting of the container 4. After completion of the tilting operation the conveyor car 1 can act upon the starting device 35 by means of an appropriate mechanism provided at the aforesaid conveyor car 1 and thereby activates this starting device 35.

However, in order to prevent the conveyor car 1 from moving into the main line 17 if there is already located at a conveyor car on such main line at the region of the cross over location 48 of the siding or auxiliary path 17′, there is provided at the main line and parallel to such a contact ledge or member 50 which can be actuated by the conveyor car 1, and upon actuation thereof precludes operation of the starting device 35.

In the case of a stop station which is serviced by operating personnel it is possible to dispense with the starting device 35 and the code marking means 49. In such case, a conveyor car 1 is manually started by actuating a start key and driven until it has reached the guide track 17.

Furthermore, in order to prevent the station 47 from becoming overcrowded it is likewise possible to arrange a contact ledge 51 or equivalent device after the switch 31, as shown, and which cooperates with the code markings constructed as electromagnets 52 in such a manner that upon actuation of the contact ledge 51 the electromagnets 52 are without current. As a result, even if there is a coincidence or correspondence of the codes of the switch 31 and the reading means 14 at the conveyor car 1 the latter will still move straight ahead.

Although, with the exemplary embodiments previously described the code markings have been constructed as magnets and the reading means as magnetic switches it is nonetheless possible to employ still other principles or expedients, such as for instance code markings constructed as light sources and reading means constructed as photoelectric cells.

What is claimed is:
1. A trackless conveyor installation comprising:
at least one conveyor car movable along a predetermined path of travel,
control means provided for said conveyor car for setting a desired destination to which the conveyor car should travel,
guide track means located along said path of travel for said conveyor car, said guide track means including means providing stop station means and means providing switch means,
drive means provided for said conveyor car for selectively propelling said conveyor car along said guide track means in a forward or reverse direction without a driver and in self-controlled manner to said desired destination,
code marking means arranged at the region of said switch means, said code marking means each corresponding to a given switch number,
code reading means provided at said conveyor car for reading said code marking means in both a forward and reverse direction of travel of said conveyor car, said code reading means comprising a plurality of spatially displaced sensing devices coupled in a predetermined circuit configuration in dependence upon said desired destination of said conveyor car as set by said control means, and
means provided at said conveyor car which control the direction of travel of the conveyor car at each relevant switch means in response to the code marking means read at such relevant switch means and in response to the destination set at said control means.

2. A trackless conveyor installation as defined in claim 1, wherein predetermined ones of said plurality of spatially displaced sensing devices are actuated by respective individual code marking means to selectively complete circuit connections within said predetermined circuit configuration, said means provided at said conveyor car which control the direction of travel of the conveyor car being responsive to said selectively completed circuit connections.

3. A trackless conveyor installation as defined in claim 2, wherein said code marking means comprises at least two magnets spatially displaced in a predetermined pattern, said sensing devices being constructed as magnetic switch means.

4. A trackless conveyor installation as defined in claim 3, wherein said magnets comprise permanent magnets.

5. A trackless conveyor installation as defined in claim 3, wherein said magnets comprise electromagnets.

6. A trackless conveyor installation as defined in claim 1, further including additional code marking means provided along said path of travel, means provided at said conveyor car, which, when aligned with said additional code marking means, read said additional code marking means and means for controlling further operations of the conveyor car as a function of the read additional code marking means.

7. A trackless conveyor installation as defined in claim 1, further including code marking means provided at said conveyor car, means arranged along the path of travel of said conveyor car for reading said code marking means of said conveyor car, and means for controlling devices provided along the path of travel of the conveyor car as a function of the read code marking means provided at the conveyor car.

8. A trackless conveyor installation as defined in claim 7, wherein said code marking means of said conveyor car comprises at least two magnets spatially displaced in a predetermined pattern.

9. A trackless conveyor installation as defined in claim 8, wherein said spatially arranged magnets are permanent magnets.

10. A trackless conveyor installation as defined in claim 8, wherein said spatially arranged magnets are electromagnets, only some of said electromagnets being energized for a given control function.

11. A trackless conveyor installation as defined in claim 7, wherein said means arranged along the path of travel of the conveyor car for reading said code marking means of said conveyor car are magnetic switches.

12. A trackless conveyor installation as defined in claim 1, wherein said code marking means and said reading means possess a marking location including respective markers, and further, wherein said reading means are operatively connected in such a manner that said code marking means can only be read at the moment of coincidence of both markers.

13. A trackless conveyor installation as defined in claim 1, wherein each switch means defines an area whereing said track means are removed.

14. A trackless conveyor installation as defined in claim 1, wherein said means providing said stop station means defines an area wherein said guide track means are removed, whereby the conveyor car automatically stops.

15. A trackless conveyor installation as defined in claim 1 wherein said conveyor car has fluid operated contact switches at the front and rear side thereof, said contact switches being constructed as hose loops, said contact switches quickly stopping said conveyor car when it meets an obstacle and wherein said contact switches can be switched in such manner that only the contact switch being in the direction of travel is operative for as long as the obstacle is present.

16. A trackless conveyor installation comprising at least one conveyor car moveable along a predetermined path of travel; control means provided for said conveyor car for setting a desired destination to which the conveyor car should travel; guide track means located along said path of travel for said conveyor car; said guide track means including means providing stop station means and means providing switch means; drive means provided for said conveyor car for propelling said conveyor car along said guide track means without a driver and in self-controlled manner to said desired destination; code marking means arranged at the region of said switch means, said code marking means each corresponding to a given switch number; means provided at said conveyor car for reading said code marking means; means provided at said conveyor car which control the direction of travel of the conveyor car at each relevant switch means in response to the code marking means read at such relevant switch means and in response to the destination set at said control means; additional code marking means provided along said path of travel; means provided at said conveyor car for reading said additional core marking means; means for controlling further operation of the conveyor car as a function of the read additional code marking means; said additional code marking means comprising a pair of magnetic band members of different polarity arranged essentially parallel to the direction of travel of said conveyor car, said magnetic band members being formed of ferromagnetic material; said means for reading said additional code marking means incorporating magnetic switch means; and wherein said additional code marking means further includes electromagnets having iron core members disposed beneath said magnetic band members and substantially perpendicular to the longitudinal direction of the latter, the polarity of said magnetic band members being changeable by altering the direction of current flow in said electromagnets.

17. A trackless conveyor installation comprising at least one conveyor car movable along a predetermined path of travel; control means provided for said conveyor car for setting a desired destination to which the conveyor car should travel; guide track means located along said path of travel for said conveyor car, said guide track means including means providing stop station means and means providing switch means; drive means provided for said conveyor car for propelling said conveyor car along said track means without a driver and in self-controlled manner to said desired destination; code marking means arranged at the region of said switch means, said code marking means each corresponding to a given switch number; means provided at said conveyor car for reading said code marking means; means provided at said conveyor car which control the direction of travel of the conveyor car at each relevant switch means in response to the code marking means read at such relevant switch means and in response to the destination set at said control means; said means providing said stop station means comprising a location wherein said guide track means are removed whereby the conveyor car automatically stops, said stop station means incorporating additional code marking means in the form of a pair of magnetic band members arranged substantially parallel to the direction of travel of said conveyor car and having different polarity, said magnetic band members consisting of ferromagnetic material; said additional code marking means further including electromagnets having iron core members arranged below said magentic band members and substantially perpendicular to the lengthwise direction thereof, change of the direction of current flow in said electromagnets bring about variation in the polarity of said magnetic band members, said magnetic band members providing starting means serving to control further travel of said conveyor car with a plurality of said magnetic band members determining the direction of travel of said conveyor car.

18. A trackless conveyor installation as defined in claim 17, wherein said guide track means includes a main line track and a branch track, a stop station means and a starting device provided at said branch track, and means actuatable by said conveyor car provided at said main line track in front of the re-entry junction of said branch track with said main line track in the direction of travel of the conveyor car for disabling said starting device at said branch track.

19. A trackless conveyor installation as defined in claim 18, wherein said means actuatable by said conveyor car comprises a contact band disposed along the path of travel of the conveyor car.

20. A trackless conveyor installation comprising at least one conveyor car moveable along a predetermined path of travel; control means provided for said conveyor car for setting a desired destination to which the conveyor car should travel; guide track means located along said path of travel for said conveyor car, said guide track means including means providing stop station means and means providing switch means; drive means provided for said conveyor car for propelling said conveyor car along said guide track means without a driver and in self-controlled manner to said desired destination; code marking means arranged at the region of said switch means, said code marking means each corresponding to a given switch number; means provided at said conveyor car for reading said code marking means; means provided at said conveyor car which control the direction of travel of said conveyor car at each relevant switch means in response to the code marking means read at such relevant switch means and in response to the destination set at said control means; elevator means into which the conveyor car can move, said elevator means incorporating at least one guide track, elevator door means provided for said elevator means, means for stopping the conveyor car in front of said elevator means, means responsive to the presence of said conveyor car for automatically calling the elevator, means for starting the conveyor car when said elevator means is free and said elevator door means are open, means for stopping the conveyor car within said elevator means, means associated with said conveyor car for selecting the destination story to which said elevator means should be displaced, and means for starting the conveyor car at the destination story for said elevator means and when said elevator door means are open.

21. A trackless conveyor installation as defined in claim 20, wherein said elevator means includes a control device, said means for automatically stopping the conveyor car in front of said elevator means being defined by a stop station location, said means for starting the conveyor car when said elevator means is empty comprising a starting mechanism provided at said stop station location and operatively coupled with the control device of said elevator means, said means for calling said elevator means including a contact tie coupled with the control device of the elevator means, said means for stopping the conveyor car in said elevator means comprising a stop station location, said means for starting said conveyor car for departing from the elevator means when the latter has arrived at its destination story comprising a starting device provided at said elevator stop station location and operatively coupled with said control device of said elevator means, and said means for selecting the story to which the elevator means should travel comprising reading means arranged at said elevator means for reading code marking means provided at said conveyor car.

22. A trackless conveyor installation as defined in claim 20, wherein said elevator guide track provides a single guide track serving both for the ascending as well as the descending direction of conveying of the conveyor car, said guide track means including respective track sections leading to and away from said elevator means, said switch means including a switch located in front of said elevator means for operatively interconnecting said track sections in front of said elevator means, said stop station means including a stop station arranged in front of said switch.

23. A trackless conveyor installation as defined in claim 20, wherein said elevator guide track incorporates a separate guide track for the ascending conveying direction and a further separate guide track for the descending conveying direction, said guide track means including respective track sections which lead to and away from said elevator means, said switch means including a double-cross switch for interconnecting said track sections, said stop station means including a stop station located in front of said double-cross switch.

References Cited

UNITED STATES PATENTS

| | | | |
|---|---|---|---|
| 1,784,387 | 12/1930 | Postel | 180—92 |
| 2,047,051 | 7/1936 | Armington et al. | 298—17.7 |
| 3,031,799 | 5/1962 | Bradsby | 248—206 |
| 3,039,554 | 6/1962 | Hosking | 180—79.1 X |
| 3,147,817 | 9/1964 | De Liban | 180—98 |
| 3,245,493 | 4/1966 | Barrett | 180—98 |

BENJAMIN HERSH, Primary Examiner

JOHN A. PEKAR, Assistant Examiner

U.S. Cl. X.R.

104—88